US008297403B2

(12) United States Patent
Panozzo et al.

(10) Patent No.: US 8,297,403 B2
(45) Date of Patent: Oct. 30, 2012

(54) PANEL MOUNTING STRUCTURE WITH SOUND REDUCTION MEMBER

(75) Inventors: Michael Panozzo, Bloomfield, MI (US); Marcus Christensen, Belmont, CA (US); Thomas Mack, Highland, MI (US)

(73) Assignee: Webasto Roof Systems, Rochester Hills, MI (US)

( * ) Notice: Subject to any disclaimer, the term of this patent is extended or adjusted under 35 U.S.C. 154(b) by 0 days.

(21) Appl. No.: 12/940,658

(22) Filed: Nov. 5, 2010

(65) Prior Publication Data
US 2012/0111661 A1 May 10, 2012

(51) Int. Cl.
F16F 7/08 (2006.01)
F16F 15/02 (2006.01)
F16F 7/00 (2006.01)
F16F 15/00 (2006.01)

(52) U.S. Cl. ......................................... 181/207; 181/209
(58) Field of Classification Search .................. 181/207, 181/208, 209
See application file for complete search history.

(56) References Cited

U.S. PATENT DOCUMENTS

| 2,196,615 A * | 4/1940 | Surprenant ................... 428/591 |
| 2,359,036 A * | 9/1944 | Harper .......................... 296/35.1 |
| 2,776,101 A * | 1/1957 | McDermott .................. 248/633 |
| 2,959,495 A * | 11/1960 | Cubberley et al. ............ 428/489 |
| 3,056,707 A * | 10/1962 | Waggoner et al. ............. 181/286 |
| 3,160,549 A * | 12/1964 | Caldwell et al. ............ 428/317.3 |
| 3,386,527 A * | 6/1968 | Daubert et al. ................ 181/208 |
| 3,472,305 A * | 10/1969 | Lefes ............................. 160/236 |
| 3,525,417 A * | 8/1970 | Giraudeau ..................... 181/208 |
| 3,679,159 A * | 7/1972 | Bach et al. ..................... 248/562 |
| 4,281,739 A * | 8/1981 | Keiser ........................... 181/207 |
| 4,734,323 A * | 3/1988 | Sato et al. .................. 428/317.3 |
| 4,806,437 A * | 2/1989 | Yokoi et al. ................... 428/623 |
| 4,953,658 A * | 9/1990 | Goto ............................. 181/207 |
| 4,957,797 A * | 9/1990 | Maeda et al. .................... 428/77 |
| 5,330,165 A * | 7/1994 | van Goubergen ............. 267/141 |
| 5,599,106 A * | 2/1997 | Kemeny .......................... 384/36 |
| 5,929,395 A * | 7/1999 | Bizlewicz ..................... 181/207 |
| 6,382,603 B1 * | 5/2002 | Monson et al. ................. 267/80 |
| 6,505,806 B1 * | 1/2003 | Glaesener ..................... 248/638 |
| 7,694,779 B2 * | 4/2010 | Takayasu et al. ............. 181/294 |
| 2003/0218957 A1 * | 11/2003 | Tanishima ................... 369/75.1 |

* cited by examiner

*Primary Examiner* — Edgardo San Martin
(74) *Attorney, Agent, or Firm* — Fitch, Even, Tabin & Flannery, LLP

(57) ABSTRACT

A panel mounting structure for a vehicle is provided having a substrate; a panel; and a separable sound reduction member disposed between the panel and the substrate and being configured to separate into at least two pieces that each remain in substantially fixed relation to a different one of the panel and the substrate, and having a material selected so that the impact of the pieces with each other causes relatively little sound. The material can be configured to separate to form the at least two pieces due to relative motion between the substrate and panel. In specific embodiments, the sound reduction member can be comprised of a sound reduction member, such as felt, or a sound reduction member layer and an adherent backing layer.

18 Claims, 2 Drawing Sheets

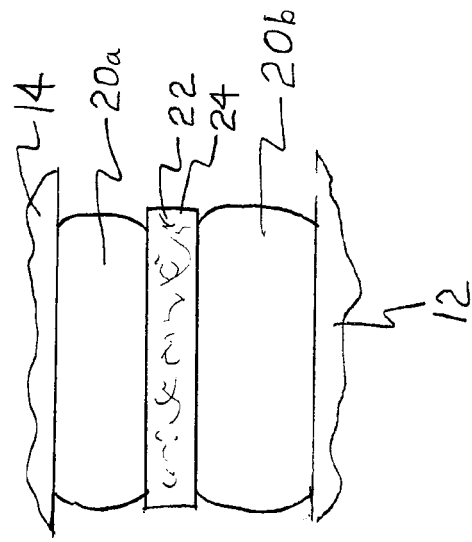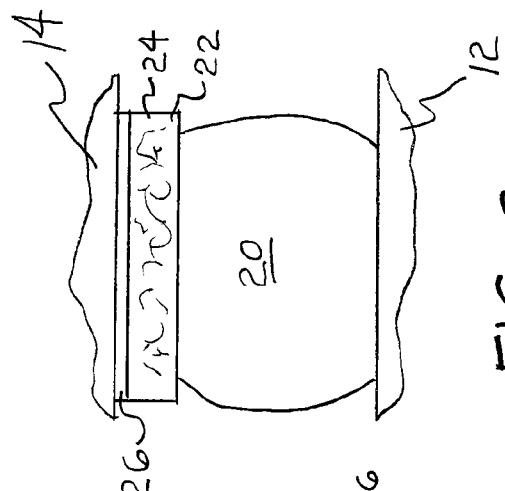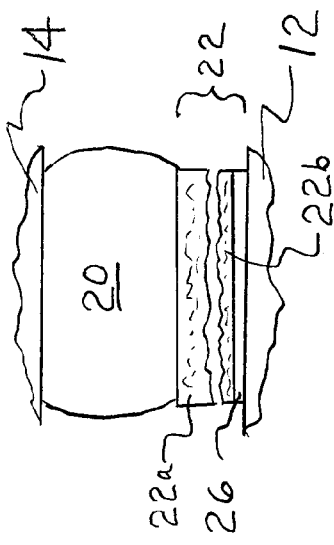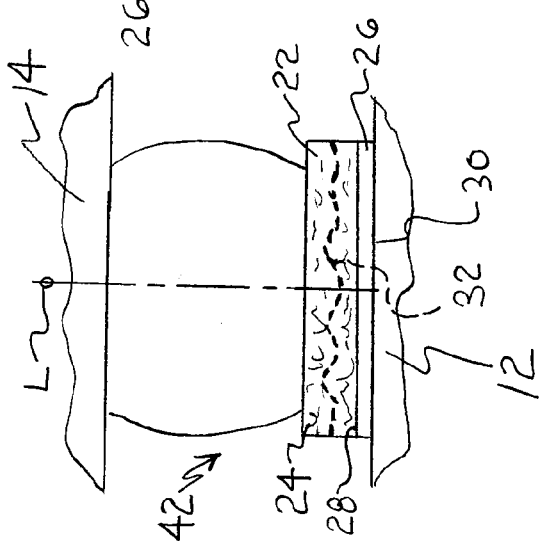

US 8,297,403 B2

PANEL MOUNTING STRUCTURE WITH SOUND REDUCTION MEMBER

FIELD

The present device and method generally relate to a structure for mounting panels on a vehicle, and particularly to adhesive structures used to mount a panel to a substrate and reduces noise created by relative motion between the panel and the substrate.

BACKGROUND

It is known to attach panels to substrates on a vehicle with adhesives, particularly glass panels for windows, sunroofs or transparent roofs, decorative panels, and the like. The substrate may be a separate frame holding the panel, which is mounted on a vehicle body or the substrate may be a frame or part integrally formed with a vehicle body.

One known procedure for mounting the panel uses two separate adhesives: a primary adhesive providing long term adhesion and a fast curing, secondary adhesive that provides stability to the panel as the primary adhesive cures. Once the vehicle is fully assembled, the secondary adhesive remains between the installed panel and substrate on the vehicle and can provide stability not only during the entire curing process of the primary adhesive, but also during manufacturing.

Since the secondary adhesive is often made of a relatively stiffer material compared to that of the primary adhesive, the secondary adhesive absorbs concentrated loads from the substrate during motion of the vehicle. This has a tendency to cause a failure, in which case, the secondary adhesive can delaminate from either the substrate or the glass panel. In this case, once the secondary adhesive is delaminated from one of the bonded surfaces, further motion between the secondary adhesive and the substrate can cause the secondary adhesive to impact with the opposing surface. This can result in an objectionable, annoying sound such as squeaking or ticking that is audible from the passenger compartment or extension of the vehicle.

SUMMARY

Accordingly, there are provided herein embodiments of a panel mounting structure with a sound reduction member that reduces the amount of noise formed by relative motion of the substrate and panel.

In one embodiment, a panel mounting structure for a vehicle is provided having a substrate; a panel; and a separable sound reduction member disposed between the panel and the substrate and being configured to separate into at least two pieces that each remain in substantially fixed relation to a different one of the panel and the substrate, and having a material selected so that the impact of the pieces with each other causes relatively little sound. The material can be configured to separate to form the at least two pieces due to relative motion between the substrate and panel.

In specific embodiments, the sound reduction member can be selected from the list consisting of felt with natural fibers, felt with synthetic fibers, rubber pads, poured polyurethane foam, microcellular polymer/plastic sheets, and the like, and combinations thereof, or a felt layer and can also have an adherent backing layer.

Other features of the present embodiment are provided. The minimum force needed to separate the felt within the felt layer can be less than the minimum force needed to separate the backing layer from the felt layer and the minimum force needed to separate the backing layer from the substrate panel. The backing layer can directly engage the substrate or directly engage the panel.

The panel mounting structure can have a backing layer having at least one of: a double-sided tape, or an adhesive sprayed onto the sound reduction member layer.

The panel mounting structure can further comprise a separately formed adhesive layer having one side engaging the sound reduction member and another side engaging one of the substrate and the panel. The material can be configured to separate to form the at least two pieces, and wherein the minimum force needed to separate the material can be less than the minimum force needed to separate the sound reduction member from the adhesive layer and the minimum force needed to separate both the sound reduction member and the adhesive layer from the panel and the substrate. The sound reduction member can be disposed between two of the adhesive layers respectively connected to the substrate and panel. Specifically, the sound reduction member can have a layer of sound reduction member, a side with an adherent backing layer, and an opposite side engaging the adhesive layer. The mounting structure can additionally have a primary adhesive adhering the substrate to the panel and a secondary adhesive, and wherein the adhesive layer is the secondary adhesive.

Methods of the present embodiments can include methods of adhering a panel to a substrate on a vehicle, including disposing a separable sound reduction member between the panel and the substrate, the sound reduction member being separable into at least two pieces that each remain in substantially fixed relation to a different one of the panel and the substrate, the sound reduction member comprising a material selected so that the impact of the pieces with each other causes relatively little sound. The sound reduction member material, such as felt with natural fibers, felt with synthetic fibers, rubber pads, poured polyurethane foam, microcellular polymer/plastic sheets, and the like, and combinations thereof, can configured to separate due to relative motion between the substrate and the panel.

Additional steps can include bonding one side of the sound reduction member to one of the panel and the substrate and another side of the sound reduction member to an adhesive layer bonded to the other of the panel and substrate. The material separates to form the at least two pieces, and wherein the minimum force needed to separate the material is less than the minimum force needed to separate the sound reduction member from the adhesive layer and the minimum force needed to separate both the sound reduction member and the adhesive layer from the panel and the substrate.

Additional steps can also include forming the sound reduction member with a sound reduction member layer and an adherent backing layer having one side adhering to the sound reduction member layer. The minimum force needed to separate the sound reduction member within the sound reduction member layer is preferably less than the minimum force needed to separate the backing layer from the sound reduction member layer and the minimum force needed to separate the backing layer from the substrate or the panel.

Additional steps can also include adhering the substrate to the panel with a primary adhesive and a secondary adhesive to hold the panel on the substrate while the primary adhesive cures, and attaching the sound reduction member to the secondary adhesive.

Other features will become more apparent to persons having ordinary skill in the art which pertains from the following description and claims.

BRIEF DESCRIPTION OF THE DRAWINGS

The foregoing features, as well as other features, will become apparent with reference to the description and Figures below, in which like numerals represent like elements, and in which:

FIG. 3 is a simplified, close-up side view of an adhesive structure for the panel mounting structure according to the present embodiments;

FIG. 4 is a simplified, close-up side view of an alternative adhesive structure according to the present embodiments;

FIG. 5 is a simplified, close-up side view of another alternative adhesive structure according to the present embodiments; and FIG. 6 is a simplified close-up side view of an adhesive structure broken into separate pieces according to the present embodiments.

DETAILED DESCRIPTION OF THE EMBODIMENTS

The present device and method generally relates to a panel mounting structure for a vehicle that uses a sound reduction member to reduce noise caused by the relative motion between a panel and a substrate upon which it is mounted.

As mentioned above, in a panel mounting structure, a secondary adhesive adheres a substrate to a panel while a primary adhesive cures between the panel and the substrate. If the secondary adhesive remains on the panel when the vehicle is installed, future delamination of the secondary adhesive may cause an audible and objectionable noise. To solve this problem, others have suggested to simply eliminate the use of a secondary adhesive, using a flexible secondary adhesive that will not concentrate loads from the motion of the vehicle, using strong secondary adhesives that will not delaminate from the bonded surfaces, or using adhesive materials that will not make a noise when impacted. These solutions, however, can be costly.

Another solution is to control the location of a break or fracture in the adhesive structure to limit subsequent noise. This can be accomplished by placing a sound reduction member adjacent the secondary adhesive so that upon receiving forces from the vehicle, the sound reduction member will tear or fracture into separate pieces before the secondary adhesive will delaminate from one of the bonded surfaces. These pieces can remain adhered to the opposite surfaces. Also, the sound reduction member can be made from a material that causes relatively little sound when the separated, opposite pieces of the sound reduction member impact each other. This advantageously reduces the sound produced by the panel mounting structure since the secondary adhesive cannot directly impact an opposing surface to make the objectionable sounds.

Figure 1:
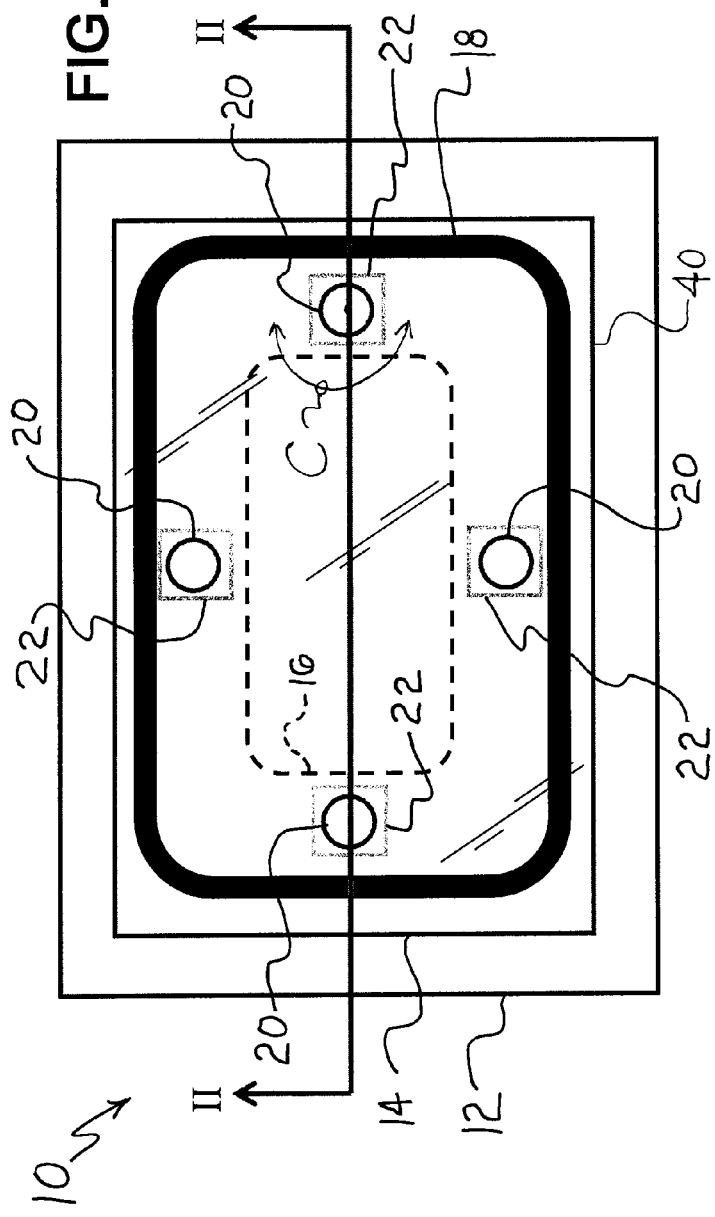
FIG. 1 is a simplified plan view of a panel mounting structure according to the present embodiments.
Figure 2:
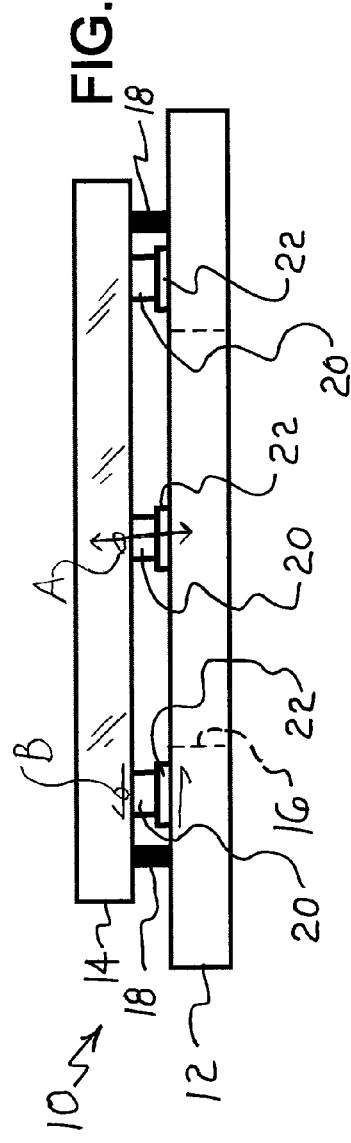
FIG. 2 is a simplified, side cross-sectional view taken along line II-II of FIG. 1.

Referring now to FIGS. 1-2, an exemplary panel mounting structure 10 has a substrate 12 adhered to a panel 14. Substrate 12 may be a part of a vehicle body or may be a separate frame mounted on the vehicle body. If the substrate 12 holds a glass panel for a window, sunroof, or transparent vehicle roof, the substrate may have an opening 16 (shown in dashed line). Otherwise substrate 12 may be solid when it supports a decorative panel that is part of the aesthetic design of the vehicle. Substrate 12 may be made of many different materials including metal, plastic, and the like. Likewise, although in the illustrated form panel 14 is made of glass, the panel may be made of any material such as polycarbonate or even steel. Also, glass panel 14 may have its own non-glass frame, rim, trim, or edge to attach directly to the adhesives rather than the glass itself. The materials of substrate 12 and panel 14 are not particularly limited as long as they can adhere to each other by an adhesive similar to that described herein.

In one form, a primary adhesive 18 can extend around the glass panel 14 and near outer edge 40 of the glass panel. Primary adhesive 18 may be made of a urethane based adhesive, and in one example, is a one-part material such as one sold under the trade name DOW 57302. Nevertheless, other two-part or multi-part adhesives may be used with or without cure accelerators. A secondary adhesive 20 also may be a urethane based adhesive and, in one form, is a hot melt adhesive such as one sold under the trade name YH America M-1000-BE, for example. It will be understood, however, that many other hot or cold applied adhesives may be used as secondary adhesive 20 so long as it cures relatively quickly compared to primary adhesive 18 to be able to hold the loads of the panel and substrate during the manufacturing process and/or while primary adhesive 20 cures. In other words, the secondary adhesive provides stability during the entire curing process of the primary adhesive as well as during manufacture.

In the illustrated example, secondary adhesive 20 is located in four locations near the primary adhesive. The spacing, locations, and shapes of the secondary adhesive depend on the size and shape of the panel and the loads the adhesive is required to carry. Thus, secondary adhesive 20 may not always be in the shape of a circular column (FIG. 2). It will also be understood that the primary and secondary adhesives 18 and 20 may be located on panel 14 where the adhesives would be covered by other panels or structure on the vehicle, or the adhesives may be relatively small such that they are difficult to see even when visible through a transparent panel.

Each secondary adhesive 20 can be aligned with, and engage, a separable sound reduction member 22. Sound reduction member 22 may include a material that has sufficient cohesion strength to hold together during the manufacture and assembly of panel mounting structure 10 onto the vehicle but that fractures or tears under the loads received from a moving vehicle that cause the substrate to move relative to the panel or vice-versa. Such a material may be a felt or felt-type layer 24 of material with natural or synthetic fibers. Examples can additionally include rubber pads, poured polyurethane foam, microcellular polymer/plastic sheets (such as those sold under the trade name PORON), combinations thereof, and the like. This material separates into pieces that themselves remain sufficiently intact to form at least two sound reduction member layers that when impacted together create relatively little sound. In one form, the initial un-separated felt layer is about 0.5 mm thick, and in another form the felt layer includes a non-woven polyester felt about 0.3 mm thick.

Referring to FIGS. 3-4, in some exemplary embodiments, sound reduction member 22 also can include an adherent backing layer 26 that has one side 28 adhering to felt layer 24 and an opposite side 30 to adhere to the substrate 12 (FIG. 3) or the panel 14 (FIG. 4) as the configuration requires. In one form, backing layer 26 can be a double-sided tape such as film supported 3M acrylic adhesive, but may be any other adhesives, such as an adhesive spray coated on felt layer 24. Otherwise, the material of backing layer 26 is not particularly limited as long as the adhesive strength between backing layer 26 and felt layer 24, as well as the adhesive strength between backing layer 26 and bonding surface 12 or 14, are both stronger than the internal or cohesive tensile and/or shear strength of the sound reduction member. Configured in this way, the sound reduction member will pull apart before backing layer 26 is pulled off of felt layer 24 or bonding surfaces 12 or 14.

Referring to FIG. 5, in another exemplary alternative, no backing layer is needed when sound reduction member 22 is disposed between two layers 20a and 20b of secondary adhesive. In this case, sound reduction member 22 may adhere directly to secondary adhesive layers 20a and 20b.

It will be appreciated that all of these adhesive configurations spaced around panel 14 may be the same at each secondary adhesive location, or the configurations may vary among those described, or some locations may have the sound reduction member and others may not.

It will also be understood that sound reduction member 22 may have other shapes than the flat square shape shown. Thus, the sound reduction member may have a cylindrical outer side surface or any other practical shape.

In operation, once panel mounting structure 10 is fully assembled on a vehicle, substrate 12 can shift in various directions relative to panel 14 and transfer at least some of the forces from the vehicle through sound reduction member 22 and secondary adhesive 20. It will be understood that forces impacting the panel mounting structure may also be an external force that impacts panel 14 first before transferring the force to substrate 12 through adhesive structures 20 and 22. Either way this relative motion between substrate 12 and panel 14 causes felt layer 22 to fracture or tear into at least two separate pieces 22a and 22b (FIG. 6) before secondary adhesive 20 and backing layer 26 delaminate from any surface they are bonded to because the low cohesive strength of felt layer 22 is the weak point (shown as tear line 32 on FIG. 3) in secondary adhesive structure 42 connecting substrate 12 to panel 14. In other words, the minimum force needed to separate the felt within felt layer 24 is less than the minimum force needed to separate (1) backing layer 26 from felt layer 24, (2) backing layer from substrate 12 or panel 14, (3) secondary adhesive 20 from felt layer 24, and (4) secondary adhesive 20 from substrate 12 or panel 14.

The separation of the felt may occur from sufficiently strong impacting forces from substrate 12 or panel 14 from a variety of directions. Thus, the separation may be caused by an axial, tensile force A (FIG. 2) in the direction of axis L (FIG. 3) urging panel 14 and substrate 12 apart, or a horizontal shearing force B (perpendicular to axis L). Similarly, a twisting force C (FIG. 3), such as, for example, about axis L that applies a pivoting force to substrate 12 or panel 14, or any other twisting force formed about any number of axes, or any tensile axial forces at any other angle could cause the separation if the force is sufficiently strong. It is understood that the separation forces may be located in a direction other than axis L.

Once separated, secondary adhesive 20 (or secondary adhesive 20a as in FIG. 5) holds one of felt pieces 22a in a fixed relation relative to the panel 14 while backing layer 26 (or secondary adhesive 20b) holds another felt piece 22b in fixed relation to substrate 12. So configured, felt pieces 22a and 22b are maintained in opposing or aligned relation so that when substrate 12 moves toward panel 14, felt pieces 22a and 22b are in position to impact each other.

Felt pieces 22a and 22b include fibers that adhere to secondary adhesive 20 and backing layer 26 in sufficient amounts such that secondary adhesive 20 and backing layer 26 cannot touch without at least impacting some fibers from one felt piece with fibers from the other felt piece. In one form, secondary adhesive 20 is completely blocked from directly contacting backing layer 26. In another form, felt pieces 22a and 22b have sufficient amounts of fiber so that secondary adhesive 20 cannot contact backing layer 26 (or opposite secondary adhesive layer 20b or substrate 12) with sufficient strength to create a noise audible by a person in the passenger compartment of the vehicle. Thus, the secondary adhesive may only create substantially non-audible sounds (to a person in the vehicle) when felt pieces 22a and 22b collide.

Also, when felt pieces 22a and 22b impact each other, the impact may not be silent. The impact may cause a thrushing sound from the fibers from one felt piece 22a brushing the fibers from the other felt piece 22b, but this thrushing sound is substantially non-audible to a person in the typical vehicle passenger compartment. It is noted that noise, even though reduced and heard within the passenger compartment, can be generated in the vehicle interior, exterior, or both.

The noise reducing impact between felt pieces 22a and 22b can also occur regardless of the direction of the impact as long as the felt pieces are aligned to be in direct contact with each other. Thus, whether the impact is axial, shear or rotational, the noise will be reduced.

It will be appreciated that the sound reduction member may only fracture or rip partially rather than entirely all the way through as shown in FIG. 6 and still operate effectively as otherwise described herein.

While the embodiments and methods have been described in conjunction with specific embodiments, it is evident that many alternatives, modifications, and variations will be apparent to those skilled in the art in light of the foregoing description.

We claim:

1. A panel mounting structure for a vehicle, comprising:
   a substrate;
   a panel; and
   a separable sound reduction member disposed in substantially fixed relation between at least a portion of the panel and the substrate to provide movement between the substrate and the panel while layers of the separable sound reduction member retain position as to each other, and the separable sound reduction member having a material selected so that the movement of the separable sound reduction member layers with each other causes relatively little sound.

2. The panel mounting structure of claim 1 wherein the material is configured to separate to form at least two pieces due to relative motion between the substrate and panel.

3. The panel mounting structure of claim 1 wherein the sound reduction member is selected from the list consisting of: felt with natural fibers, felt with synthetic fibers, rubber pads, poured polyurethane foam, microcellular polymer/plastic sheets, and combinations thereof.

4. The panel mounting structure of claim 1 wherein the sound reduction member further comprises an adherent backing layer.

5. The panel mounting structure of claim 4 wherein the minimum force needed to separate the sound reduction member within the sound reduction member layer is less than the minimum force needed to separate the backing layer from the sound reduction member layer and the minimum force needed to separate the backing layer from the substrate panel.

6. The panel mounting structure of claim 4 wherein the backing layer directly engages the substrate.

7. The panel mounting structure of claim 4 wherein the backing layer directly engages the panel.

8. The panel mounting structure of claim 4 wherein the backing layer is at least one of:

a double-sided tape, and an adhesive sprayed onto the sound reduction member layer.

9. The panel mounting structure of claim 1 further comprising a separately formed adhesive layer having one side engaging the substrate and another side engaging the panel.

10. The panel mounting structure of claim 2, wherein the material is configured to separate to form the at least two pieces, and wherein the minimum force needed to separate the material is less than the minimum force needed to separate the sound reduction member from the adhesive layer and the minimum force needed to separate both the sound reduction member and the adhesive layer from the panel and the substrate.

11. A method of adhering a panel to a substrate on a vehicle, comprising:

disposing a separable sound reduction member between at least a portion of the panel and the substrate, the sound reduction member being separable into at least two pieces that each remain in substantially fixed relation to a different one of the panel and the substrate, the sound reduction member comprising a material selected so that the impact of the pieces with each other causes relatively little sound.

12. The method of claim 11 wherein the material is configured to separate due to relative motion between the substrate and the panel.

13. The method of claim 11 wherein the sound reduction material is selected from the list of felt with natural fibers, felt with synthetic fibers, rubber pads, poured polyurethane foam, microcellular polymer/plastic sheets, and the like, and combinations thereof.

14. The method of claim 11 further comprising bonding one side of the sound reduction member to one of the panel and the substrate and another side of the sound reduction member to an adhesive layer bonded to the other of the panel and substrate.

15. The method of claim 14 wherein the material separates to form the at least two pieces, and wherein the minimum force needed to separate the material is less than the minimum force needed to separate the sound reduction member from the adhesive layer and the minimum force needed to separate both the sound reduction member and the adhesive layer from the panel and the substrate.

16. The method of claim 11 further comprising forming the sound reduction member with a sound reduction member layer and an adherent backing layer having one side adhering to the sound reduction member layer.

17. The method of claim 16 wherein the minimum force needed to separate the sound reduction member within the sound reduction member layer is less than the minimum force needed to separate the backing layer from the sound reduction member layer and the minimum force needed to separate the backing layer from the substrate or the panel.

18. The method of claim 11 further comprising adhering the substrate to the panel with a primary adhesive and a secondary adhesive to hold the panel on the substrate while the primary adhesive cures, and attaching the sound reduction member to the secondary adhesive.

* * * * *